United States Patent
Gupta et al.

(10) Patent No.: US 9,686,266 B2
(45) Date of Patent: *Jun. 20, 2017

(54) UTILIZING X.509 AUTHENTICATION FOR SINGLE SIGN-ON BETWEEN DISPARATE SERVERS

(71) Applicant: Microsoft Technology Licensing, LLC, Redmond, WA (US)

(72) Inventors: Ajay Gupta, Hyderabad (IN); Sudeep Rastogi, Hyderabad (IN); Shyam Sundar Jayasankar, Issaquah, WA (US); Diwakar Mantha, Hyderabad (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/992,545

(22) Filed: Jan. 11, 2016

(65) Prior Publication Data

US 2016/0205092 A1 Jul. 14, 2016

Related U.S. Application Data

(63) Continuation of application No. 13/666,397, filed on Nov. 1, 2012, now Pat. No. 9,270,667.

(51) Int. Cl.
H04L 29/06 (2006.01)

(52) U.S. Cl.
CPC ...... *H04L 63/0815* (2013.01); *H04L 63/0823* (2013.01)

(58) Field of Classification Search
None
See application file for complete search history.

(56) References Cited

U.S. PATENT DOCUMENTS

| 6,275,941 B1 * | 8/2001 | Saito ............... G06F 21/33 713/175 |
| 7,047,404 B1 * | 5/2006 | Doonan ............ G06F 21/64 380/30 |

(Continued)

FOREIGN PATENT DOCUMENTS

EP 2107757 A1 10/2009

OTHER PUBLICATIONS

"Integrating Microsoft Office SharePoint Server 2007 and SAP", Published on: Aug. 8, 2012, Available at: http://www.gig-werks.com/Documents/Integrating_Microsoft_Office_SharePoint_Server_2007_and_SAP.pdf, 25 pages.

(Continued)

*Primary Examiner* — Trang Doan

(57) ABSTRACT

An authentication scheme may be utilized for a single sign-on operation between servers. One or more servers (e.g., a SHAREPOINT server) receives a data request directed to a disparate server (e.g., an SAP server). A root certificate (e.g., an X.509 root certificate) is loaded for accessing the disparate server. A user certificate is dynamically generated for identifying a logged-in user. The user certificate is signed with the root certificate and sent to the disparate server for binding with the data request. The data request is sent to the disparate server for authentication using the user certificate. The disparate server accesses a mapping table to map a subject name in the user certificate. When an entry for the logged-in user is found in the mapping table, data operations are enabled between the servers. An open web protocol response containing the requested data is then received from the disparate server.

20 Claims, 7 Drawing Sheets

(56) References Cited

U.S. PATENT DOCUMENTS

| | | | |
|---|---|---|---|
| 9,270,667 B2 | 2/2016 | Gupta et al. | |
| 2003/0196108 A1* | 10/2003 | Kung | H04L 63/0823 726/6 |
| 2004/0088542 A1* | 5/2004 | Daude | H04L 12/4641 713/156 |
| 2008/0301784 A1* | 12/2008 | Zhu | H04L 63/0823 726/5 |
| 2011/0246764 A1* | 10/2011 | Gamez | G06F 21/41 713/155 |
| 2014/0122870 A1 | 5/2014 | Gupta et al. | |

OTHER PUBLICATIONS

Strien, William Van, "Duet Enterprise: Execution Flow of Duet Enterprise Single Sign-On", Published on: May 2, 2012, Available at: http://scn.sap.com/community/duet-enterprise/blog/2012/05/02/execution-flow-of-duet-enterprise-single-sign-on, 3 pages.

"Interoperability between SAP NetWeaver Portal and Microsoft SharePoint Technologies", Published on: Mar. 2008, 4vailable at: http://download.microsoft.com/download/b/c/1/bc1939d9-638f-4053-b602-4258f18bb683/cb_045_interoperability%20between%20sap%20netweaver%20portal%20and%20microsoft%20sharepoint%20server%202007.pdf, 182 pages.

Boettcher, et al., "Unleash the Power of Single Sign-On with Microsoft and SAP", Published on: Sep. 2007, Available at: http://download.microsoft.com/download/c/6/c/c6c42b9f-66f4-47b3-99be-8e5afa1ddc9a/SSO%20with%20MS%20and%20SAP.pdf, 36 pages.

"Google Search Appliance", 2010, Retrieved on: Aug. 8, 2012, 4vailable at: http://static.googleusercontent.com/external_content/untrusted_dlcp/www.google.com/en/intl/en_au/enterprise/pdf/gsa_datasheet.pdf, 6 pages.

"Overview of Duet Enterprise for SharePoint and SAP Server 2.0 Preview", Published on: Jul. 16, 2012, Available at: http://technet.microsoft.com/en-us/library/ff972433(v=office.15).aspx, 14 pages.

Gilani, et al., "SAP iView Integration with Microsoft Office SharePoint 2007", In White Paper of Microsoft—collaboration Brief, Dec. 2008, 15 pages.

"International Search Report & Written Opinion for PCT Patent Application No. PCT/US2013/067911", Mailed Date: Feb. 18, 2014, Filed Date: Nov. 1, 2013, 10 pages.

"Information Technology—Open Systems Interconnection—The Directory: Public-key and Attribute Certificate Frameworks", A International Telecommunication Union Document, X.509, Oct. 2012, 208 Pages.

U.S. Appl. No. 13/666,397, Office Action mailed Jun. 11, 2015, 8 pages.

U.S. Appl. No. 13/666,397, Amendment and Response filed Sep. 11, 2015, 10 pages.

U.S. Appl. No. 13/666,397, 312 Amendment filed Dec. 28, 2015, 9 pages.

U.S. Appl. No. 13/666,397, Response to 312 Amendment mailed Jan. 15, 2016, 2 pages.

U.S. Appl. No. 13/666,397, Notice of Allowance mailed Sep. 28, 2015, 9 pages.

\* cited by examiner

UTILIZING X.509 AUTHENTICATION FOR SINGLE SIGN-ON BETWEEN DISPARATE SERVERS

CROSS REFERENCE TO RELATED APPLICATION

This application is a Continuation of U.S. patent application Ser. No. 13/666,397, now U.S. Pat. No. 9,270,667, filed Nov. 1, 2012 and entitled "UTILIZING X.509 AUTHENTICATION FOR SINGLE SIGN-ON BETWEEN DISPARATE SERVERS," which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Today, many business and government organizations utilize enterprise software for performing various business functions and providing services. Business functions may include order processing, procurement, production scheduling, customer information management, energy management, and accounting. Services provided by enterprise software are typically business-oriented tools such as online shopping and online payment processing, interactive product catalogue, automated billing systems, security, enterprise content management, IT service management, customer relationship management, enterprise resource planning, business intelligence, project management, collaboration, human resource management, manufacturing, enterprise application integration, and enterprise forms automation. Enterprise software is typically hosted on servers and provides simultaneous services to a large number of users, typically over a computer network. This is in contrast to a single-user application that is executed on a user's personal computer and serves only one user at a time. Enterprise software which is utilized by many business and government organizations includes the SAP application from SAP AG CORPORATION of Walldorf, Germany.

Enterprise software is often integrated with web application platforms hosted by separate servers to enable users to remotely access data hosted by enterprise software servers by initiating a "sign-on" operation (i.e., a user name login) from a web application platform server to an enterprise software server. Once such web application platform may include the SHAREPOINT SERVER application from MICROSOFT CORPORATION of Redmond, Wash. One known problem associated with accessing data between web application platform servers and enterprise software servers is associated with the authentication required for performing a single sign-on operation to enable all of the various security settings and data access privileges required for accessing data on enterprise software servers. Previous solutions for solving the aforementioned problem have included the use of Security Assertion Markup Language ("SAML") token authentication with the open data protocol ("OData"). OData is utilized by some web application platform software and enterprise application software applications for querying and updating data over Hypertext Transfer Protocol ("HTTP"), including the SHAREPOINT SERVER application software and the SAP application software. However, OData does not prescribe any authentication method when used with SAML. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for utilizing an authentication scheme to facilitate a single sign-on operation between disparate servers. One or more servers (e.g., a SHAREPOINT server) receives a data request directed to a disparate server (e.g., an SAP server). A root certificate (e.g., an X.509 root certificate) is loaded for accessing the disparate server via a single sign-on operation. A user certificate is dynamically generated for identifying a logged-in user. It should be understood however, that in alternative embodiment, the user certificate may be pre-generated during configuration and stored in a secure store service. Following the generation of the user certificate, the user certificate is signed with the root certificate and sent to the disparate server for binding with the data request. The data request is sent to the disparate server for authentication using the user certificate. The disparate server accesses a mapping table to map a subject name in the user certificate. When an entry for the logged-in user is found in the mapping table, data operations are enabled between the servers. An open web protocol response containing the requested data is then received from the disparate server.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments are provided for utilizing an authentication scheme to facilitate a single sign-on operation between disparate servers. One or more servers (e.g., a SHAREPOINT server) receives a data request directed to a disparate server (e.g., an SAP server). A root certificate (e.g., an X.509 root certificate) is loaded for accessing the disparate server via a single sign-on operation. A user certificate is dynamically generated for identifying a logged-in user. Then, the user certificate is signed with the root certificate and sent to the disparate server for binding with the data request. The data request is sent to the disparate server for authentication using the user certificate. The disparate server accesses a mapping table to map a subject name in the user certificate. It should be understood that, prior to consulting the mapping table, the disparate server may verify that the user certificate is valid. Since the disparate server was previously configured to know about the root certificate, the disparate server may use this knowledge to validate that the data request came from a trusted originating server. When an entry for the logged-in user is found in the mapping table, data operations are enabled between the servers. An open web protocol response containing the requested data is then received from the disparate server.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
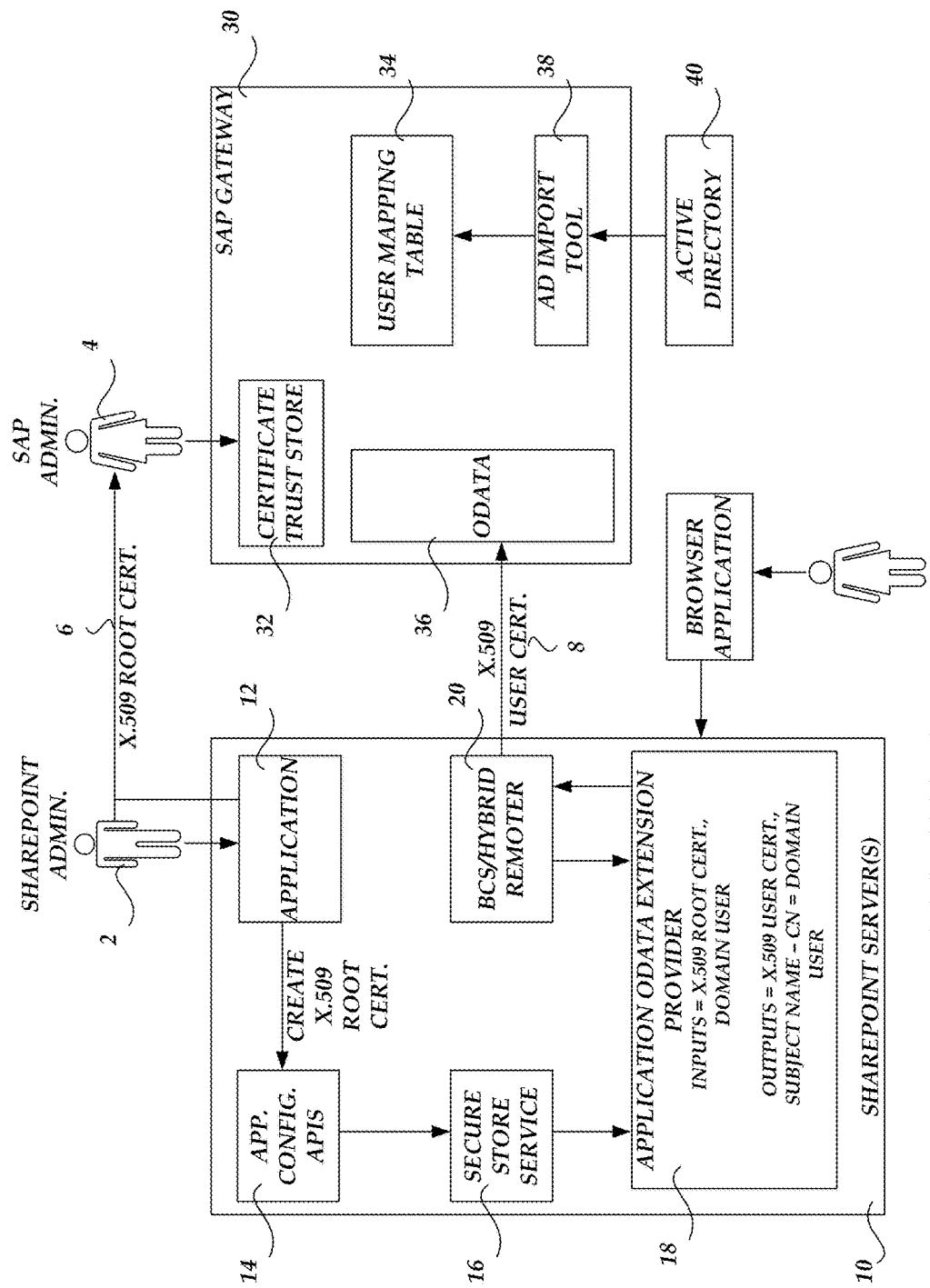
FIG. 1 is a block diagram illustrating a network architecture for utilizing an authentication scheme for a single sign-on between disparate servers, in accordance with various embodiments.

Referring now to the drawings, in which like numerals represent like elements through the several figures, various aspects of the present invention will be described. FIG. 1 is a block diagram illustrating a network architecture for utilizing an authentication scheme for a single sign-on between disparate servers, in accordance with various embodiments. The network architecture includes one or more servers 10 (hereinafter referred to as "the server 10") in communication with a server 30. In accordance with an embodiment, the server 10 may comprise one or more computers configured for executing the SHAREPOINT SERVER application from MICROSOFT CORPORATION of Redmond, Wash. It should be understood that, in accordance with embodiment, the server 10 may comprise multiple computers (i.e., a server farm) where each server is configured for executing the aforementioned SHAREPOINT SERVER application. It should be appreciated, however, that other server applications from other manufacturers may be utilized in accordance with the various embodiments described herein. In accordance with an embodiment, the server 30 may comprise an SAP gateway which is configured for executing the SAP application from SAP AG CORPORATION of Walldorf, Germany. As is known to those skilled in the art, the SAP application may be utilized by an enterprise for performing various business functions and providing services. Business functions may include order processing, procurement, production scheduling, customer information management, energy management, and accounting. Services may include business-oriented tools such as online shopping and online payment processing, interactive product catalogue, automated billing systems, security, enterprise content management, IT service management, customer relationship management, enterprise resource planning, business intelligence, project management, collaboration, human resource management, manufacturing, enterprise application integration, and enterprise forms automation. It should be appreciated, however, that other enterprise software from other manufacturers may be utilized in accordance with the various embodiments described herein.

In accordance with an embodiment, the servers 10 and 30 may each be utilized by administrators 2 and 4 (e.g., a SHAREPOINT administrator and an SAP administrator). In particular, the administrator 2 may utilize the application 12 to initiate the creation of a root certificate 6 and the communication of the root certificate 6 to the administrator 4. The administrator 4 may initiate the storing of the root certificate 6 into a certificate trust store 32 on the server 30. In accordance with an embodiment, the root certificate 6 may comprise an X.509 root certificate. As known to those skilled in the art, X.509 is an ITU-T standard for public key infrastructure ("PKI") and privilege management infrastructure ("PMI"). X.509 may specify, among other things, standard formats for public key certificates, certificate revocation lists, attribute certificates, and a certification path validation algorithm. In an X.509 system, a certification authority may issue a certificate which binds a public key to a particular distinguished name or to an alternative name such as an e-mail address or a DNS-entry. It should be understood that the server 10 may also be utilized by end user 70 for retrieving requested data. For example, in accordance with an embodiment, the end user 70 may utilize browser application 72 to log-in to a SHAREPOINT server for data retrieval.

The server 10 may include an application 12, application configuration application program interfaces ("APIs") 14, a secure store service 16, an application open data protocol ("Odata") extension provider 18 and a business connectivity services ("BCS")/hybrid remoter 20. In accordance with an embodiment, the application 12 may comprise the DUET ENTERPRISE software jointly developed by MICROSOFT CORPORATION of Redmond, Wash. and SAP AG CORPORATION of Walldorf, Germany. As is known to those skilled in the art, DUET ENTERPIRSE software blends SAP and SHAREPOINT functionality by combining collaboration and productivity with business data and processes. As will be described in greater detail below with respect to FIG. 3, the application 12 may be configured to utilize the root certificate 6 in dynamically creating a user certificate for enabling single sign-on operations with the server 30.

The application configuration APIs 14 may be utilized for receiving the root certificate 6 created by the application 12 and to store the root certificate 6 in the secure store service 16. The application OData extension provider 18 is a software plug-in for the BCS/Hybrid remoter 20. The application OData extension provider 18 may be configured receive the root certificate 6 from the secure store service 16 in addition to a domain user. The OData extension provider 18 may also be configured to output a dynamically created user certificate 8 for enabling single sign-on operations with the server 30 (the details of which will be discussed below with respect to FIG. 3) and a user certificate subject name in a format which is consistent and agreed upon between the server 10 and the server 30. In accordance with an embodiment, the user certificate 8 may comprise an X.509 user certificate. As is known to those skilled in the art, OData is an open web protocol for querying and updating data. The protocol allows for querying a data source over the HTTP protocol and to receive results back in any of a number of formats including, without limitation, plain extensible markup language ("XML"), Atom (an XML language utilized for web feeds) and JavaScript Object Notation ("JSON"). The results may include pagination, ordering or filtering of data. It should be understood however, that the embodiments described herein are not limited to the OData protocol and that other web protocols for querying and updating data may also be utilized, including, for example, the GOOGLE data protocol ("GData") from GOOGLE CORPORATION of Mountain View, Calif.

The BCS/Hybrid remoter 20 may be utilized to call the application OData extension provider 18 to retrieve the dynamically created user certificate 8 and the user certificate subject name for sending to the server 30. It should be understood that, in accordance with an embodiment, all authentication and data exchange (including calls) between the server 10 and the server 30 occur over Hypertext Transfer Protocol Secure ("HTTPS").

The server 30 may include the certificate trust store 32, a user mapping table 34, OData 36 and an active directory ("AD") import tool 38. As discussed above, the certificate trust store 32 may be utilized to store the root certificate 6 received from the server 10. The user mapping table 34 may comprise user mappings for users of the server 10. The user mappings may comprise a list of user certificate 8 subject names (along with associated domains) for users of the server 10 (i.e., external IDs) and a corresponding list of user names (i.e., SAP IDs) in a format compatible for accessing the various functions and services provided by the server 30. It should be understood that the aforementioned user mappings may be imported into the mapping table 34 using the AD import tool 38 which, in turn, may retrieve the user mappings from the active directory 40. The user mapping table 34 will be described in greater detail below with respect to FIG. 2. The OData 36 in the server 30 represents a server protocol service (e.g., an SAP OData protocol service) which is utilized for accepting the dynamically generated user certificate 8 from the BCS/Hybrid remoter 20 on the server 10 in order to enable a single sign-on between the server 10 and the sever 30.

Figure 2:
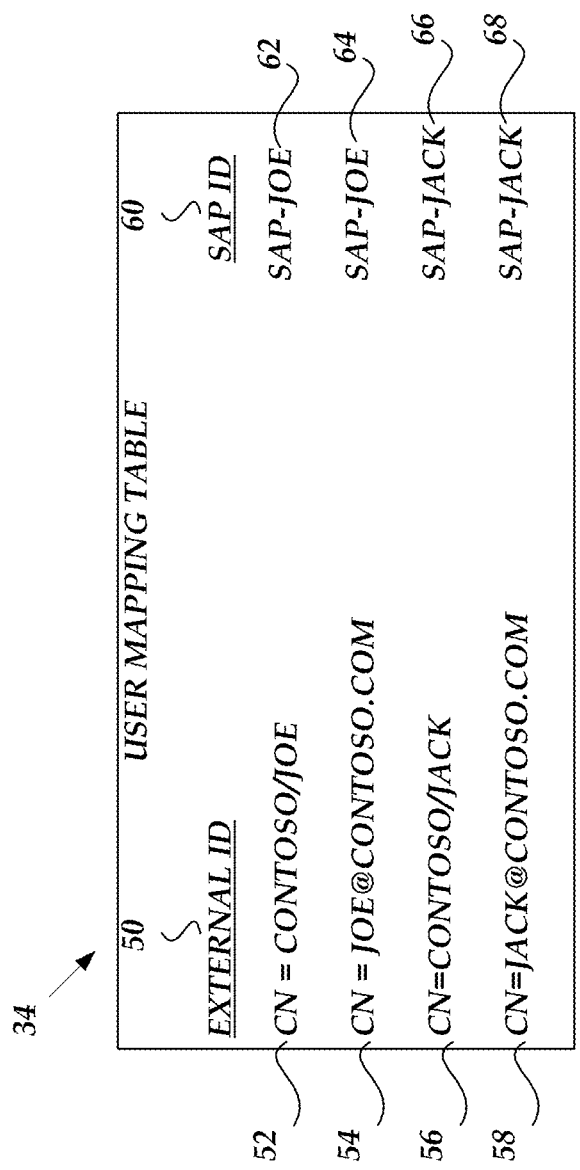
FIG. 2 is a block diagram illustrating a user mapping table which is utilized in executing a single sign-on between disparate servers, in accordance with various embodiments.

FIG. 2 is a block diagram illustrating the user mapping table 34 which is utilized in executing a single sign-on between disparate servers, in accordance with various embodiments. In accordance with an embodiment, the user mapping table 34 may include a list of external IDs 50 for users of the sever 10 and a list of IDs 60 (e.g. SAP IDs) formatted for use on the server 30. In particular, the list of external IDs 50 may include IDs 52, 54, 56 and 58 which are each formatted according to a user name and either an on-premises domain or an online domain. For example, Joe and Jack are employees of the Contoso company who wish to access company human resources data which is remotely hosted on an SAP server (i.e., the server 30) via a single sign-on operation from an on-premises company server (i.e., the server 10). In setting up access for the aforementioned employees, the company administrator determines that both Joe and Jack are mixed domain users of the company server. That is, sometimes Joe and Jack access the company server while on the company premises via SHAREPOINT on-premises (e.g., Contoso company headquarters) while other times Joe and Jack access the company server from home-based client computers online via SHAREPOINT online. As a result, the user mapping table 34 may be populated with two external IDs for each user. In particular, the IDs 52 and 56 may represent user names corresponding to an on-premises domain (e.g., CN=domain/username) and the IDs 54 and 58 may represent user names corresponding to an online domain (e.g., CN=username@domain.com). The list of IDs 60 (e.g., the SAP IDs) may include IDs 62, 64, 66 and 68, and be associated with a corresponding external ID 50. Thus, for example, the IDs 52 and 54 for Joe (i.e., CN=Contoso/Joe and CN=Joe@Contoso.com) would be mapped to the IDs 62 and 64 (i.e., SAP-Joe) while the IDs 56 and 58 for Jack (i.e., CN=Contoso/Jack and CN=Jack@Contoso.com) would be mapped to the IDs 66 and 68.

Figure 3:
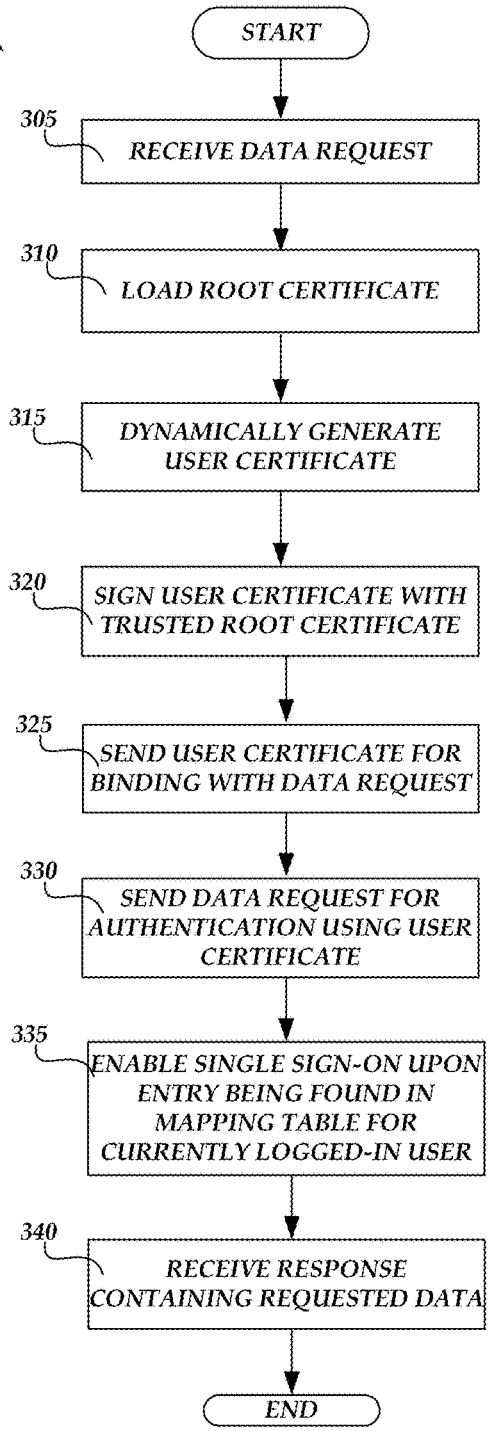
FIG. 3 is a flow diagram illustrating a routine for utilizing an authentication scheme for a single sign-on between disparate servers, in accordance with various embodiments.

FIG. 3 is a flow diagram illustrating a routine 300 for utilizing an authentication scheme for a single sign-on between disparate servers, in accordance with various embodiments. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIG. 3 and making up the various embodiments described herein are referred to variously as operations, structural devices, acts or modules. It will be recognized by one skilled in the art that these operations, structural devices, acts and modules may be implemented in software, in firmware, in special purpose digital logical, and any combination thereof without deviating from the spirit and scope of the present invention as recited within the claims set forth herein.

The routine 300 begins at operation 305, where the server 10 receives a data request directed to the server 30. For example, a user of a SHAREPOINT server may wish to access company human resources data stored on an SAP gateway server. Upon receiving the data request, the server 10 may prepare to forward the request to the server 30 as part of a single-sign on operation which will be described in detail below.

From operation 305, the routine 300 continues to operation 310, where the server 10 may load a root certificate for accessing the server 30 via a single sign-on operation. In particular, the X.509 root certificate 6 may be retrieved from the secure store service 16 on the server 10. It should be understood that the root certificate is trusted by both the server 10 and the server 30.

From operation 310, the routine 300 continues to operation 315, where the server 10 may dynamically generate a user certificate for identifying a currently logged-in user. In particular, the application 12 may utilize the application OData extension provider 18 to generate the X.509 user certificate 8 for identifying users a currently logged-in on-premises user of the server 10 and/or a currently logged-in online user of the server 10. Thus, it should be understood that the server 10 may provide support for both multiple domain users and mixed mode environments (e.g., SHAREPOINT on-premises and SHAREPOINT online). For example, in dynamically generating the user certificate 8, a subject name for a currently logged-in on-premises user may be specified in a fixed format (e.g., CN=domain/username or CN=username@domain.com).

From operation 315, the routine 300 continues to operation 320, where the server 10 may sign the dynamically generated user certificate with the root certificate. For example, the X.509 user certificate 8 may be signed with the X.509 root certificate 6.

From operation 320, the routine 300 continues to operation 325, where the server 10 may send the dynamically generated user certificate to the server 30 for binding with the data request received at operation 305. In particular, the application OData extension provider 18 may send the X.509 user certificate 8 to the BCS/Hybrid remoter 20 for binding the X.509 user certificate 8 to an outgoing HTTPS request directed to the OData 36 on the server 30.

From operation 325, the routine 300 continues to operation 330, where the server 10 may send the data request for authentication using the dynamically generated user certificate. In particular, the BC S/Hybrid remoter 20 may bind the X.509user certificate 8, received from the OData extension provider 18, to an outgoing HTTPS request directed to the OData 36 on the server 30. It should be understood that once the OData 36 receives the aforementioned HTTPS request, a trust chain of the X.509 user certificate 8 may be authenticated by the server 30 accessing the mapping table 34. In particular, the server 30 may access the mapping table 34 to map a subject name in the X.509 user certificate 8 to an SAP user. It should be understood that the authentication may fail if the X.509 root certificate 6 has expired or is not trusted. Under these circumstances, an error code (e.g., an HTTP 403 "Forbidden" error code) may be returned as the HTTP response from the server 30.

From operation 330, the routine 300 continues to operation 335, where the server 10 may enable a single sign-on for the currently logged-in user with the server 30 upon an entry being found in the mapping table for the currently logged-in user. In particular, upon the entry being found, a security context for the currently logged-in user is created on the sever 30 and subsequent data operations (e.g., SAP data operations) will occur with the aforementioned user context. Thus, for example, all SAP authorizations configured for an SAP user will apply. It should be understood that if an entry is not found, an error code (e.g., an HTTP 403 "Forbidden" error code) may be returned as the HTTP response from the server 30.

From operation 335, the routine 300 continues to operation 340, where the server 10 may receive a response containing the requested data from the server 30. In particular, the server 10 may receive an OData response containing requested SAP data from the server 30. It should be understood that if the data request was originally made from an online SHAREPOINT user, the OData response may be channeled via the BCS/Hybrid remoter 20 back to SHAREPOINT online. From operation 340, the routine 300 then ends.

Figure 4:
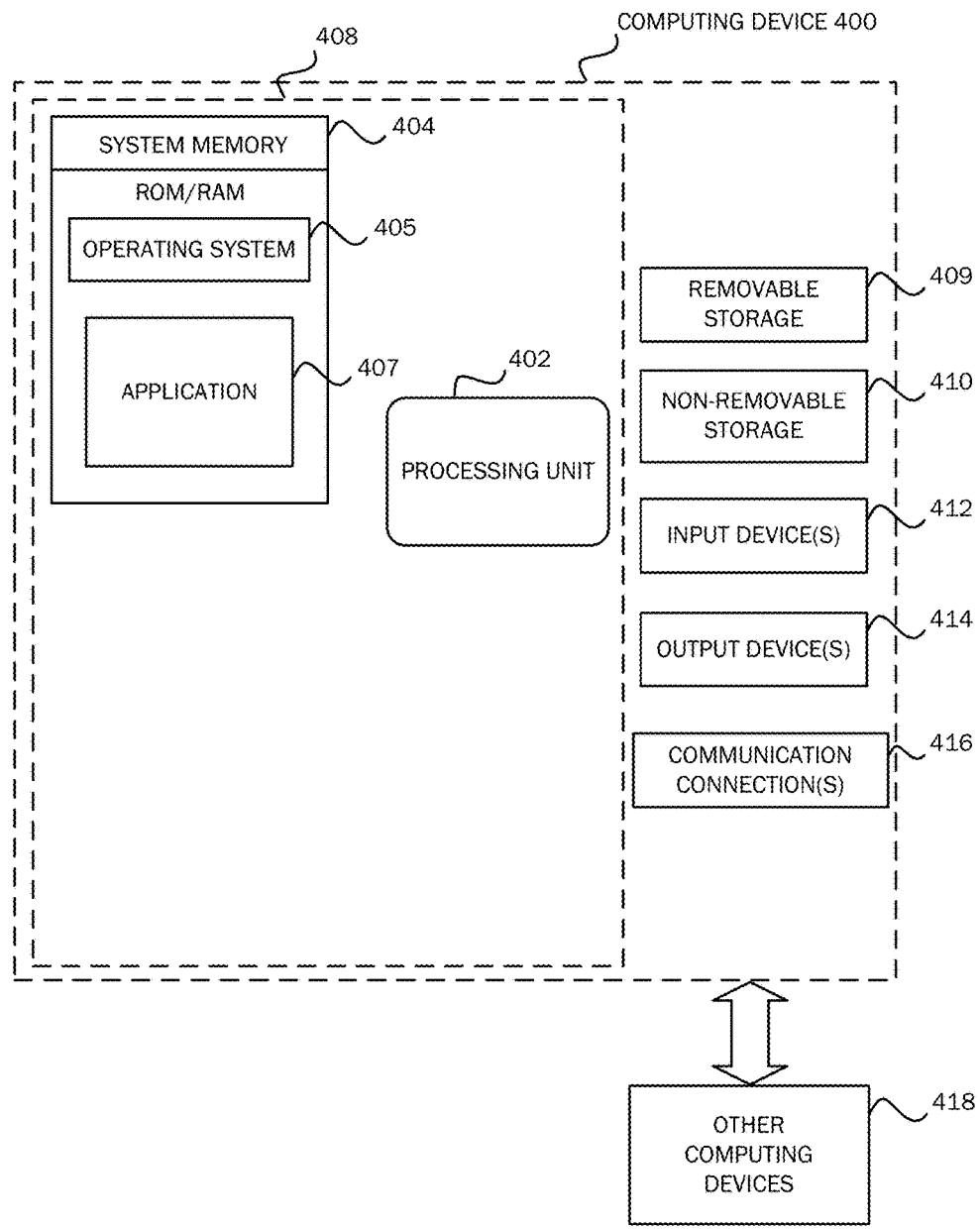
FIG. 4 is a simplified block diagram of a computing device with which various embodiments may be practiced.

FIG. 4 is a block diagram illustrating example physical components of a computing device 400 with which various embodiments may be practiced. In a basic configuration, the computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include an operating system 405 and application 407. Operating system 405, for example, may be suitable for controlling computing device 400's operation and, in accordance with an embodiment, may comprise the WINDOWS operating systems from MICROSOFT CORPORATION of Redmond, Wash. The application 407, for example, may comprise functionality for performing one or more of the operations in the routine 300 described above with respect to FIG. 3. It should be understood, however, that the embodiments described herein may also be practiced in conjunction with other operating systems and application programs and further, is not limited to any particular application or system.

The computing device 400 may have additional features or functionality. For example, the computing device 400 may also include additional data storage devices (removable and/or non-removable) such as, for example, magnetic disks, optical disks, solid state storage devices ("SSD"), flash memory or tape. Such additional storage is illustrated in FIG. 4 by a removable storage 409 and a non-removable storage 410. The computing device 400 may also have input device(s) 412 such as a keyboard, a mouse, a pen, a sound input device (e.g., a microphone) for receiving a voice input, a touch input device for receiving gestures, etc. Output device(s) 414 such as a display, speakers, a printer, etc. may also be included. The aforementioned devices are examples and others may be used.

Generally, consistent with various embodiments, program modules may be provided which include routines, programs, components, data structures, and other types of structures that may perform particular tasks or that may implement particular abstract data types. Moreover, various embodiments may be practiced with other computer system configurations, including hand-held devices, multiprocessor systems, microprocessor-based or programmable consumer electronics, minicomputers, mainframe computers, automotive computing systems and the like. Various embodiments may also be practiced in distributed computing environments where tasks are performed by remote processing devices that are linked through a communications network. In a distributed computing environment, program modules may be located in both local and remote memory storage devices.

Furthermore, various embodiments may be practiced in an electrical circuit comprising discrete electronic elements, packaged or integrated electronic chips containing logic gates, a circuit utilizing a microprocessor, or on a single chip containing electronic elements or microprocessors. For example, various embodiments may be practiced via a system-on-a-chip ("SOC") where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may operate via application-specific logic integrated with other components of the computing device/system 400 on the single integrated circuit (chip). Embodiments may also be practiced using other technologies capable of performing logical operations such as, for example, AND, OR, and NOT, including but not limited to mechanical, optical, fluidic, and quantum technologies. In addition, embodiments may be practiced within a general purpose computer or in any other circuits or systems.

Various embodiments, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information (such as computer readable instructions, data structures, program modules, or other data) in hardware. The system memory 404, removable storage 409, and non-removable storage 410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 400. Any such computer storage media may be part of the computing device 400.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 5A:
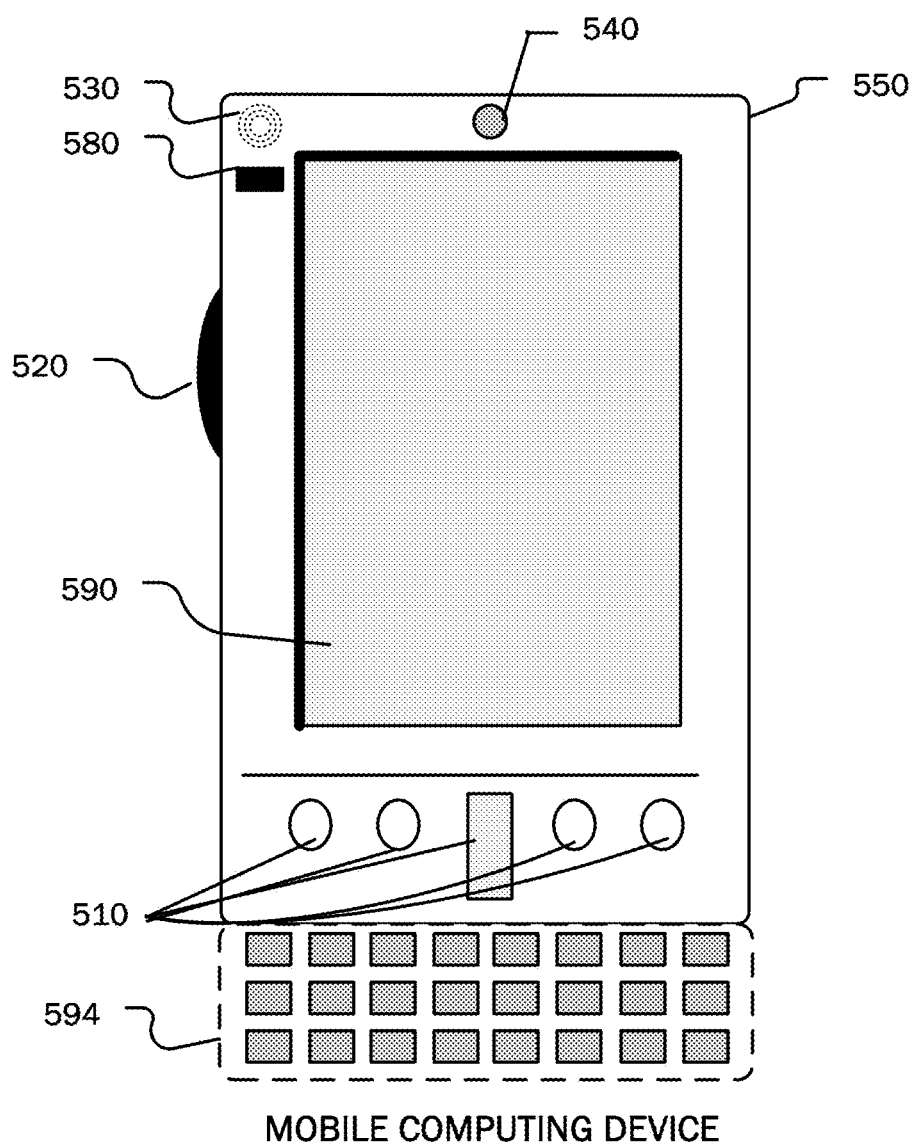
FIG. 5A is a simplified block diagram of a mobile computing device with which various embodiments may be practiced.
Figure 5B:
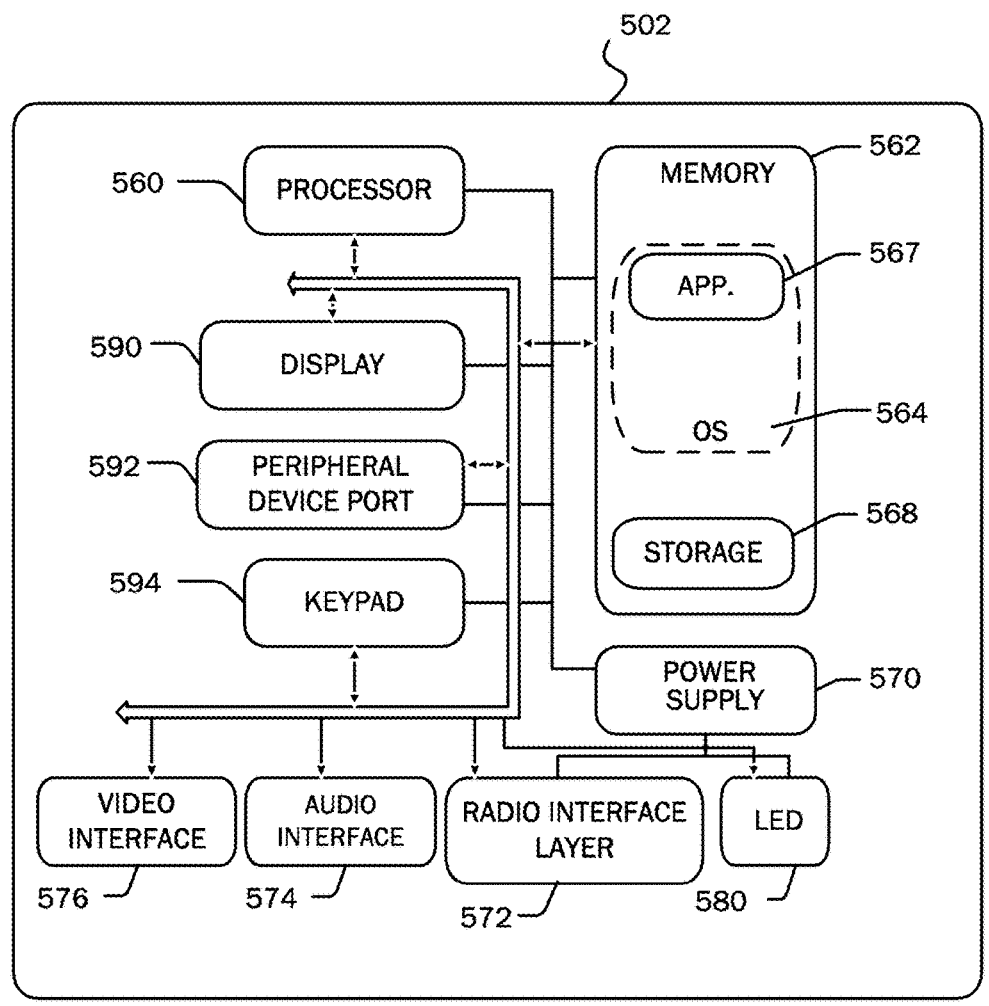
FIG. 5B is a simplified block diagram of a mobile computing device with which various embodiments may be practiced.

FIGS. 5A and 5B illustrate a suitable mobile computing environment, for example, a mobile computing device 550 which may include, without limitation, a smartphone, a tablet personal computer, a laptop computer, and the like, with which various embodiments may be practiced. With reference to FIG. 5A, an example mobile computing device 550 for implementing various embodiments is illustrated. In a basic configuration, mobile computing device 550 is a handheld computer having both input elements and output elements. Input elements may include touch screen display 525 and input buttons 510 that allow the user to enter information into mobile computing device 550. Mobile computing device 550 may also incorporate an optional side input element 520 allowing further user input. Optional side input element 520 may be a rotary switch, a button, or any other type of manual input element. In alternative embodiments, mobile computing device 550 may incorporate more or less input elements. For example, display 525 may not be a touch screen in some embodiments. In yet another alternative embodiment, the mobile computing device is a portable telephone system, such as a cellular phone having display 525 and input buttons 510. Mobile computing device 550 may also include an optional keypad 594. Optional keypad 594 may be a physical keypad or a "soft" keypad generated on the touch screen display.

Mobile computing device 550 incorporates output elements, such as display 590, which can display a graphical user interface (GUI). Other output elements include speaker 530 and LED light 580. Additionally, mobile computing device 550 may incorporate a vibration module (not shown), which causes mobile computing device 550 to vibrate to notify the user of an event. In yet another embodiment, mobile computing device 550 may incorporate a headphone jack (not shown) for providing another means of providing output signals.

Although described herein in combination with mobile computing device 550, in alternative embodiments may be used in combination with any number of computer systems, such as in desktop environments, laptop or notebook computer systems, multiprocessor systems, micro-processor based or programmable consumer electronics, network PCs, mini computers, main frame computers and the like. Various embodiments may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate the various embodiments described herein.

FIG. 5B is a block diagram illustrating components of a mobile computing device used in one embodiment, such as the mobile computing device 550 shown in FIG. 5A. That is, mobile computing device 550 can incorporate a system 502 to implement some embodiments. For example, system 502 can be used in implementing a "smart phone" or tablet computer that can run one or more applications similar to those of a desktop or notebook computer. In some embodiments, the system 502 is integrated as a computing device, such as an integrated personal digital assistant (PDA) and wireless phone.

Application 567 may be loaded into memory 562 and run on or in association with an operating system ("OS") 564. The system 502 also includes non-volatile storage 568 within memory the 562. Non-volatile storage 568 may be used to store persistent information that should not be lost if system 502 is powered down. The application 567 may use and store information in the non-volatile storage 568. A synchronization application (not shown) also resides on system 502 and is programmed to interact with a corresponding synchronization application resident on a host computer to keep the information stored in the non-volatile storage 568 synchronized with corresponding information stored at the host computer. As should be appreciated, other applications may also be loaded into the memory 562 and run on the mobile computing device 550.

The system 502 has a power supply 570, which may be implemented as one or more batteries. The power supply 570 might further include an external power source, such as an AC adapter or a powered docking cradle that supplements or recharges the batteries.

The system 502 may also include a radio 572 (i.e., radio interface layer) that performs the function of transmitting and receiving radio frequency communications. The radio 572 facilitates wireless connectivity between the system 502 and the "outside world," via a communications carrier or service provider. Transmissions to and from the radio 572 are conducted under control of OS 564. In other words, communications received by the radio 572 may be disseminated to the application 567 via OS 564, and vice versa.

The radio 572 allows the system 502 to communicate with other computing devices, such as over a network. The radio 572 is one example of communication media. The embodiment of the system 502 is shown with two types of notification output devices: LED 580 that can be used to provide visual notifications and an audio interface 574 that can be used with speaker 530 to provide audio notifications. These devices may be directly coupled to the power supply 570 so that when activated, they remain on for a duration dictated by the notification mechanism even though processor 560 and other components might shut down for conserving battery power. The LED 580 may be programmed to remain on indefinitely until the user takes action to indicate the powered-on status of the device. The audio interface 574 is used to provide audible signals to and receive audible signals from the user. For example, in addition to being coupled to speaker 530, the audio interface 574 may also be coupled to a microphone (not shown) to receive audible input, such as to facilitate a telephone conversation. In accordance with embodiments, the microphone may also serve as an audio sensor to facilitate control of notifications. The system 502 may further include a video interface 576 that enables an operation of on-board camera 540 (shown in FIG. 5A) to record still images, video streams, and the like.

A mobile computing device implementing the system 502 may have additional features or functionality. For example, the device may also include additional data storage devices (removable and/or non-removable) such as, magnetic disks, optical disks, or tape. Such additional storage is illustrated in FIG. 5B by storage 568.

Data/information generated or captured by the mobile computing device 550 and stored via the system 502 may be stored locally on the mobile computing device 550, as described above, or the data may be stored on any number of storage media that may be accessed by the device via the radio 572 or via a wired connection between the mobile computing device 550 and a separate computing device associated with the mobile computing device 550, for example, a server computer in a distributed computing network such as the Internet. As should be appreciated such data/information may be accessed via the mobile computing device 550 via the radio 572 or via a distributed computing network. Similarly, such data/information may be readily transferred between computing devices for storage and use according to well-known data/information transfer and storage means, including electronic mail and collaborative data/information sharing systems.

Figure 6:
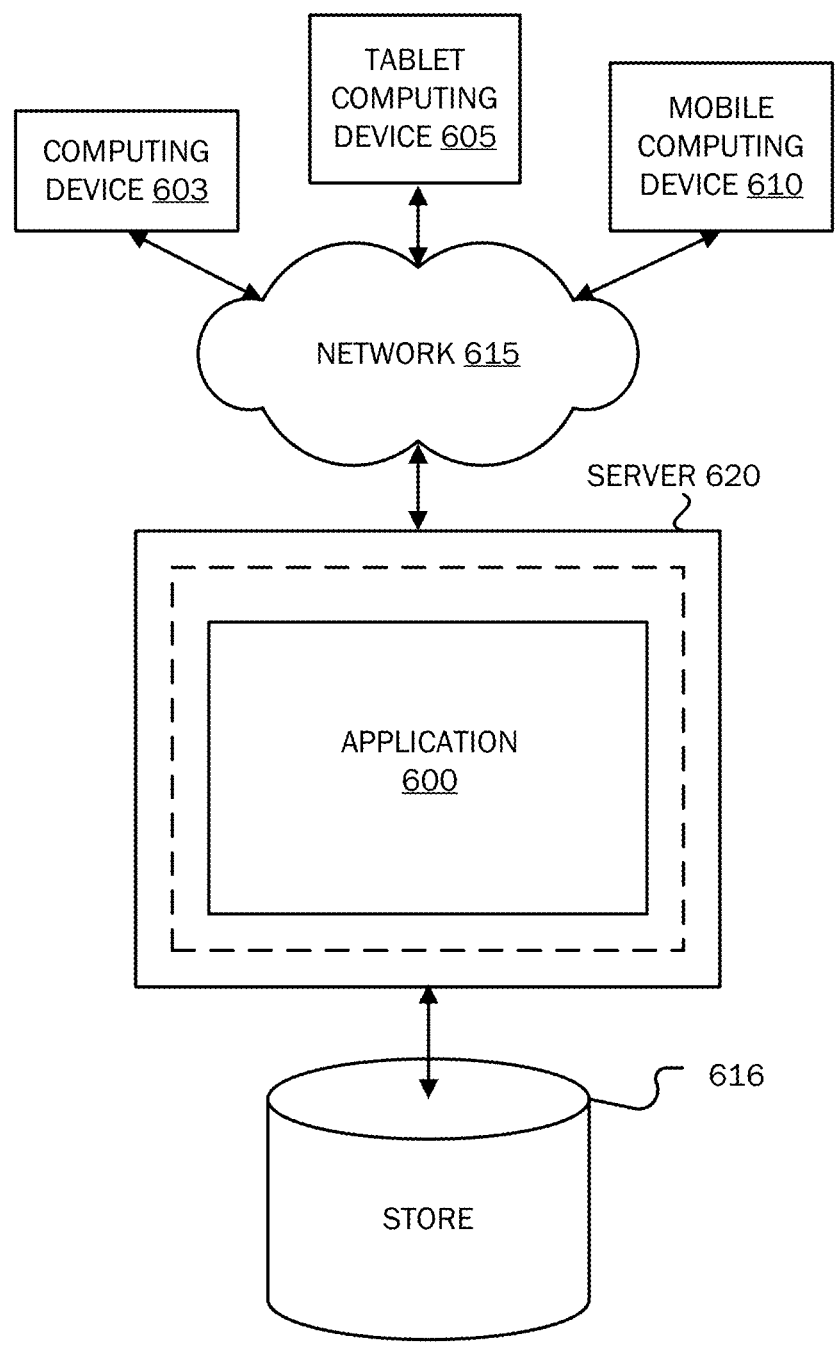
FIG. 6 is a simplified block diagram of a distributed computing system in which various embodiments may be practiced.

FIG. 6 is a simplified block diagram of a distributed computing system in which various embodiments may be practiced. The distributed computing system may include number of client devices such as a computing device 603, a tablet computing device 605 and a mobile computing device 610. The client devices 603, 605 and 610 may be in communication with a distributed computing network 615 (e.g., the Internet). A server 620 is in communication with the client devices 603, 605 and 610 over the network 615. The server 620 may store application 600 which may be perform routines including, for example, one or more of the operations in the routine 300 described above with respect to FIG. 3.

Various embodiments are described above with reference to block diagrams and/or operational illustrations of methods, systems, and computer program products. The functions/acts noted in the blocks may occur out of the order as shown in any flow diagram. For example, two blocks shown in succession may in fact be executed substantially concurrently or the blocks may sometimes be executed in the reverse order, depending upon the functionality/acts involved.

While certain embodiments have been described, other embodiments may exist. Furthermore, although various embodiments have been described as being associated with data stored in memory and other storage mediums, data can also be stored on or read from other types of computer-readable media, such as secondary storage devices (i.e., hard disks, floppy disks, or a CD-ROM), a carrier wave from the Internet, or other forms of RAM or ROM. Further, the disclosed routine's operations may be modified in any manner, including by reordering operations and/or inserting or operations, without departing from the embodiments described herein.

It will be apparent to those skilled in the art that various modifications or variations may be made without departing from the scope or spirit of the embodiments described herein. Other embodiments will be apparent to those skilled in the art from consideration of the specification and practice of the embodiments described herein.

What is claimed is:

1. A computer-implemented method of utilizing an authentication scheme for a single sign-on between disparate servers, comprising:
    receiving, by a first server, a request for data stored on a second server from a currently logged-in user of the first server;
    retrieving, by the first server, a root certificate for accessing the second server via a single sign-on operation;
    dynamically generating, by the first server, a user certificate for identifying the currently logged-in user;
    signing, by the first server, the user certificate with the root certificate;
    sending, by the first server, the request for data to the second server for authentication using the user certificate; and
    receiving, by the first server, a response containing the requested data from the second server.

2. The computer-implemented method of claim 1, further comprising binding the user certificate to the request for data.

3. The computer-implemented method of claim 1, wherein receiving, by the first server, a response containing the requested data from the second server comprises receiving an open protocol data (OData) response from the second server.

4. The computer-implemented method of claim 1, wherein receiving, by the first server, a request for data stored on the second server, comprises receiving, by a SHAREPOINT server, a request for data stored on an SAP server.

5. The computer-implemented method of claim 1, wherein loading, by the first server, a root certificate for accessing the second server via a single sign-on operation comprises loading a root certificate which is trusted by both the first and second servers.

6. The computer-implemented method of claim 1, wherein retrieving, by the first server, a root certificate for accessing the second server via a single-sign on operation comprises retrieving an X.509 root certificate.

7. The computer-implemented method of claim 1, wherein dynamically generating, by the first server, a user certificate for identifying a currently logged-in user on the first server comprises dynamically generating a user certificate for identifying a currently logged-in on-premises user on the first server.

8. The computer-implemented method of claim 7, wherein dynamically generating a user certificate for identifying a currently logged-in on-premises user on the first server comprises specifying a subject name for the currently logged-in on-premises user in a fixed format, wherein the fixed format is defined such that a plurality of domain users are supported.

9. The computer-implemented method of claim 1, wherein dynamically generating, by the first server, a user certificate for identifying a currently logged-in user on the first server comprises generating a user certificate for identifying a currently logged-in online user on the first server.

10. The computer-implemented method of claim 9, wherein dynamically generating a user certificate for identifying a currently logged-in online user on the first server comprises specifying a subject name for the currently logged-in online user in a fixed format, wherein the fixed format is defined such that a plurality of domain users are supported.

11. A system for utilizing X.509 authentication for a single sign-on between disparate servers, comprising:
  a SAP server comprising at least a memory storage device and a processor; and
  a plurality of SHAREPOINT servers in communication with the SAP server, at least one of the plurality of SHAREPOINT servers being operative to:
    receive a request for data stored on the SAP server;
    retrieve an X.509 root certificate for accessing the SAP server via a single sign-on operation;
    dynamically generate a user certificate for identifying a currently logged-in user of the SHAREPOINT servers;
    sign the user certificate with the X.509 root certificate;
    send the request for data to the SAP server for authentication using the user certificate, the authentication comprising accessing a mapping table for mapping a subject name in the user certificate to a user of the SAP server; and
    receive a response containing the requested data from the SAP server.

12. The system of claim 11, wherein the SAP server is operative to enable the single sign-on between the plurality of SHAREPOINT servers and the SAP server, upon an entry being found in the mapping table for the currently logged-in user, the found entry enabling data operations to occur between the currently logged-in user and the SAP server.

13. The system of claim 12, wherein the SAP server is further operative to create a security context for the currently logged-in user upon the entry being found in the mapping table, the security context being usable for subsequent data operations from the currently logged-in user.

14. The system of claim 11, wherein the response containing the requested data is an open protocol data (OData) response.

15. The system of claim 11, wherein the plurality of SHAREPOINT servers are further operative to send the user certificate to the SAP server for binding with the request for data.

16. A system for utilizing an authentication scheme for a single sign-on between disparate servers, comprising:
  at least one processor; and
  memory, operatively connected to the at least one processor and storing instructions that, when executed by the at least processor, cause the at least one processor to perform a method for utilizing an authentication scheme for a single sign-on between disparate servers, the method comprising:
    receiving, by a first server, a request for data stored on a second server from a currently logged-in user of the first server;
    retrieving, by the first server, a root certificate for accessing the second server via a single sign-on operation;
    dynamically generating, by the first server, a user certificate for identifying the currently logged-in user;
    signing, by the first server, the user certificate with the root certificate;
    sending, by the first server, the request for data to the second server for authentication using the user certificate; and
    receiving, by the first server, a response containing the requested data from the second server.

17. The system of claim 16, wherein the method further comprises binding the user certificate to the request for data.

18. The system of claim 16, wherein receiving, by the first server, a response containing the requested data from the second server comprises receiving an open protocol data (OData) response from the second server.

19. The system of claim 16, wherein receiving, by the first server, a request for data stored on the second server, comprises receiving, by a SHAREPOINT server, a request for data stored on an SAP server.

20. The system of claim 16, wherein retrieving, by the first server, a root certificate for accessing the second server via a single-sign on operation comprises retrieving an X.509 root certificate.

* * * * *